(12) United States Patent
Verleene et al.

(10) Patent No.: US 9,884,356 B2
(45) Date of Patent: Feb. 6, 2018

(54) WIRE DRAWING METHOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Arnaud Verleene, Clermont-Ferrand (FR); Sébastien Noel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 112 days.

(21) Appl. No.: 14/422,729

(22) PCT Filed: Jul. 31, 2013

(86) PCT No.: PCT/EP2013/066111
§ 371 (c)(1),
(2) Date: Feb. 20, 2015

(87) PCT Pub. No.: WO2014/037161
PCT Pub. Date: Mar. 13, 2014

(65) Prior Publication Data
US 2015/0239294 A1    Aug. 27, 2015

(30) Foreign Application Priority Data

Sep. 7, 2012   (FR) ...................... 12 58399

(51) Int. Cl.
B21C 1/04         (2006.01)
B21C 37/04      (2006.01)
(Continued)

(52) U.S. Cl.
CPC ............ B21C 1/04 (2013.01); B21C 1/003 (2013.01); B21C 9/00 (2013.01); B21C 37/045 (2013.01);
(Continued)

(58) Field of Classification Search
CPC ......... B21C 1/04; B21C 1/003; B21C 37/045; D07B 2205/3053; D07B 1/066; D07B 2205/305; D07B 2801/10; C21D 8/06
See application file for complete search history.

(56) References Cited

U.S. PATENT DOCUMENTS 5,535,612 A    7/1996  Vijayakar ................. 72/43
5,956,935 A *  9/1999  Katayama ........... D07B 1/066
                                                    152/527

(Continued)

FOREIGN PATENT DOCUMENTS

EP    0 233 659 A1    8/1987
EP    2 083 094 A1    7/2009
(Continued)

OTHER PUBLICATIONS

"Micro-alloyed steel cord constructions for tyres," Research Disclosure, Mason Publications, vol. 349, No. 84, pp. 10-23 (May 1, 1993).

*Primary Examiner* — R. K. Arundale
*Assistant Examiner* — Mohammad Yusuf
(74) *Attorney, Agent, or Firm* — Fitzpatrick, Cella, Harper & Scinto

(57) ABSTRACT

A process for drawing a steel wire, in which the wire has a carbon content by weight C of $0.4\% \leq C \leq 0.74\%$, includes an uninterrupted series of drawing steps. The drawing steps draw the wire from a diameter d' to a diameter d, with d' and d being expressed in mm, and with a true strain $\epsilon'$ of the steel wire being given by $\epsilon' = 2 \times \ln(d'/d)$, with $\epsilon' > 4$.

22 Claims, 1 Drawing Sheet

(51) Int. Cl.
*B21C 1/00* (2006.01)
*D07B 1/06* (2006.01)
*B21C 9/00* (2006.01)
*B21F 19/00* (2006.01)
B60C 9/00 (2006.01)
B60C 9/20 (2006.01)
B60C 9/04 (2006.01)

(52) U.S. Cl.
CPC .............. *B21F 19/00* (2013.01); *D07B 1/066* (2013.01); *B60C 9/0007* (2013.01); *B60C 2009/0475* (2013.01); *B60C 2009/2074* (2013.01); *B60C 2009/2077* (2013.01)

(56) References Cited

U.S. PATENT DOCUMENTS

| | | | | |
|---|---|---|---|---|
| 6,048,416 | A | * | 4/2000 | Hauser .................. C21D 8/065 148/500 |
| 8,555,689 | B2 | | 10/2013 | Hollinger et al. ............. 72/274 |
| 2004/0118486 | A1 | * | 6/2004 | Zelin ...................... D07B 1/066 148/522 |
| 2011/0206552 | A1 | * | 8/2011 | Shimizu .................. B21C 1/003 420/99 |
| 2012/0175034 | A1 | | 7/2012 | Gauthier et al. .............. 152/527 |
| 2015/0007922 | A1 | | 1/2015 | Lardjane et al. ............. 152/527 |
| 2015/0013873 | A1 | | 1/2015 | Lardjane et al. ............. 152/527 |

FOREIGN PATENT DOCUMENTS

| | | |
|---|---|---|
| FR | 2 913 355 A1 | 9/2008 |
| JP | 59-35655 A | 2/1984 |
| JP | H06-2039 A | 1/1994 |
| JP | H06-184965 A | 7/1994 |
| JP | 8-156514 A | 6/1996 |
| JP | 8-325964 A | 12/1996 |
| JP | 2000-63990 A | 2/2000 |
| JP | 2000-219938 A | 8/2000 |
| JP | 2004-359992 A | 12/2004 |
| JP | 2007-131945 A | 5/2007 |
| JP | 2010-202920 A | 9/2010 |
| WO | WO 2010/139583 A1 | 12/2010 |

* cited by examiner

WIRE DRAWING METHOD

FIELD OF THE INVENTION

The invention relates to a steel wire, in particular for a tyre.

RELATED ART

A tyre with carcass reinforcement, for example radial carcass reinforcement, comprises a tread, two inextensible beads, and two sidewalls connecting the beads to the tread and a crown reinforcement, placed circumferentially between the carcass reinforcement and the tread.

The crown and/or carcass reinforcement comprises one or more rubber plies, optionally reinforced by reinforcing elements or reinforcers such as individual metal wires or metal cords originating from the assembly of several individual metal wires. The metal reinforcers are made of steel.

The crown reinforcement generally consists of at least two superposed crown plies, sometimes referred to as "working" plies or "crossed" plies, the generally metallic reinforcing cords of which are placed so as to be practically parallel to one another within a ply but crossed from one ply to another, that is to say they are inclined, whether symmetrically or not, to the median circumferential plane, by an angle which is generally between 10° and 45° depending on the type of tyre in question. The crossed plies may be supplemented by various other auxiliary rubber plies or layers, having variable widths depending on the case, and that may or may not comprise reinforcers. Mention may be made, by way of example, of simple rubber pads, plies referred to as "protective" plies responsible for protecting the rest of the crown reinforcement from external attack or perforations, or else plies referred to as "hooping" plies comprising reinforcers oriented substantially in the circumferential direction (plies referred to as "zero degree" plies), whether they are radially outer or inner with respect to the crossed plies.

However, these metal reinforcers contribute significantly to the weight of the tyre which it is desired to lighten as much as possible, by improving, if possible, their mechanical strength.

It is then recommended to increase the weight content of elements of the steel, for example of carbon, to a level of 0.9%, or even more, which makes it possible to increase the mechanical strength of the wires, and therefore to reduce the diameter and/or the density thereof in the reinforcing plies, and lighten the tyre. A tyre is obtained that is lightened but that has a relatively modest endurance. This is because the metal reinforcers are more sensitive to fatigue and to corrosion due to the use of relatively high carbon contents by weight.

BRIEF DESCRIPTION OF EMBODIMENTS OF THE INVENTION

The objective of the invention is to provide a lighter metal reinforcer, of high mechanical strength and that is resistant, in particular to corrosion.

For this purpose, one subject of the invention is a process for drawing a steel wire in which the wire has a carbon content by weight C such that $0.4\% \leq C \leq 0.74\%$, the process comprising an uninterrupted series of drawing steps of the wire from a diameter $d'$ to a diameter $d$, $d'$ and $d$ being expressed in mm, in which the true strain $\epsilon' = 2 \times \ln(d'/d)$ is such that $\epsilon' > 4$.

The wire used has a relatively low carbon content by weight C. Thus, the drawability of the wire, that is to say the possibility of obtaining a relatively small diameter $d$ from a relatively large diameter $d'$, is improved. In other words, the relatively low carbon content by weight C allows a high true strain $\epsilon'$ which makes it possible to sufficiently work harden the wire in order to give it high mechanical strength properties, in particular a high maximum tensile strength.

Thus, the wire is relatively insensitive to fatigue and to corrosion which improves the endurance of the tyre. Furthermore, it is possible to reduce the diameter of the wire while retaining a mechanical strength sufficient for reinforcing the tyre.

The maximum tensile strength or ultimate tensile strength corresponds to the force necessary to break the wire. The measurements of maximum tensile strength, denoted by R (in MPa), are carried out according to the ISO 6892 standard of 1984.

An uninterrupted series of drawing steps is understood to mean that the wire does not undergo any step, in particular heat treatment step, other than a drawing step between two drawing steps of the series. In other words, the wire does not undergo any step, in particular heat treatment step, between two directly successive drawing steps of the series.

Advantageously, $\epsilon' \geq 4.3$, preferably $\epsilon' \geq 4.5$ and more preferably $\epsilon' \geq 4.7$.

The wire then has an improved maximum tensile strength R.

In one embodiment, the wire has a carbon content by weight C such that $0.4\% \leq C \leq 0.5\%$, preferably $0.42\% \leq C \leq 0.48\%$.

In one embodiment, the wire has a carbon content by weight C such that $0.5\% \leq C \leq 0.6\%$, preferably $0.5\% < C < 0.6\%$, and more preferably $0.55\% \leq C \leq 0.6\%$.

In one embodiment, the wire has a carbon content by weight C such that $0.6\% \leq C \leq 0.74\%$, preferably $0.65\% \leq C \leq 0.74\%$.

According to optional characteristics:

$d'$ is greater than or equal to 1 mm and preferably greater than or equal to 1.3 mm. The diameter $d'$ is large enough to obtain high mechanical properties by work hardening of the wire.

$d'$ is less than or equal to 2.2 mm and preferably less than or equal to 2 mm. The diameter $d'$ is small enough to allow work hardening to the final diameter of the wire.

Advantageously, $d$ is greater than or equal to 0.10 mm and preferably greater than or equal to 0.12 mm.

When the diameter $d$ is too small, industrial production cost of the wire becomes too high and incompatible with mass production.

Advantageously, $d$ is less than or equal to 0.25 mm and preferably less than or equal to 0.23 mm.

When the diameter $d$ is too large, the flexibility and endurance of the wire are too low for a use of the wire in certain plies of the tyre, in particular the carcass reinforcement, for example for a vehicle of the heavy-duty vehicle type.

Optionally, the steel microstructure is ferritic-pearlitic or pearlitic. A ferritic-pearlitic or pearlitic microstructure is distinguished from another microstructure, in particular martensitic microstructure, by metallographic observation. Ferritic-pearlitic microstructure has ferrite grains and also lamellar pearlitic zones. Pearlitic microstructure has substantially only ferrite and cementite lamellae. On the contrary, martensitic microstructure comprises laths and/or needles that a person skilled in the art will know how to distinguish from the grains and lamellae of the ferritic-pearlitic and pearlitic microstructures.

According to one optional characteristic of the process, the uninterrupted series of drawing steps of the wire from the diameter d' to the diameter d is carried out in a wet environment.

Wet drawing is understood to mean that the wire circulates in a liquid environment, for example an aqueous solution. Preferably, the drawing lubricant during wet drawing is in liquid form. During wet drawing, the pulling means, for example capstans, are exposed to the liquid environment, for example the aqueous solution.

Preferably, the process comprises, before the series of drawing steps of the wire from the diameter d' to the diameter d, an uninterrupted series of drawing steps of the wire from a diameter D to the diameter d'.

An uninterrupted series of drawing steps is understood to mean that the wire does not undergo any step, in particular heat treatment step, other than a drawing step between two drawing steps of the series. In other words, the wire does not undergo any step, in particular heat treatment step, between two directly successive drawing steps of the series.

Advantageously, the true strain $\epsilon = 2 \times \ln(D/d')$ is such that $\epsilon \leq 3$, preferably $\epsilon \leq 2.75$ and more preferably $\epsilon \leq 2.5$.

Thus, the drawing of the wire is limited from the diameter D to the diameter d' which makes it possible to sufficiently work harden the wire during the uninterrupted series of drawing steps of the wire from the diameter d' to the diameter d in order to increase its mechanical tensile strength R.

Preferably, the series of drawing steps of the wire from the diameter D to the diameter d' is carried out in a dry environment.

Dry drawing is understood to mean that the wire circulates in a gaseous environment, for example ambient air. Preferably, the drawing lubricant during dry drawing is in pulverulent form. During dry drawing, the pulling means, for example capstans, are exposed to the ambient air.

Preferably, the true strain $\epsilon T = 2 \times \ln(D/d)$ is such that $\epsilon T \geq 6.5$, preferably $\epsilon T \geq 6.75$ and more preferably $\epsilon T \geq 7$.

Optionally, D is greater than or equal to 4 mm, preferably greater than or equal to 5 mm.

Advantageously, the wire of diameter d' is heat treated.

Preferably, the microstructure of the steel is observed before this heat treatment step.

Advantageously, the wire of diameter d' is coated with at least one metal layer.

BRIEF DESCRIPTION OF THE DRAWINGS

The invention will be better understood on reading the following description, given solely by way of nonlimiting example and with reference to the drawings in which.

DETAILED DESCRIPTION OF EMBODIMENTS OF THE INVENTION

Tyre

Figure 1:
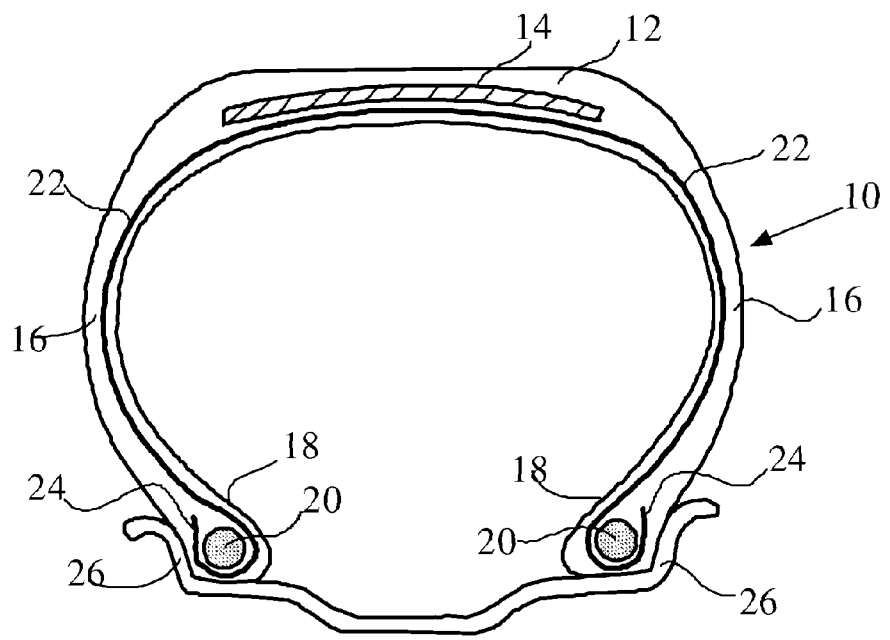
FIG. 1 is a cross-sectional view perpendicular to the circumferential direction of a tyre comprising a wire capable of being obtained by the process according to the invention.

Represented in FIG. 1 is a tyre according to the invention and denoted by the general reference 10.

The tyre 10 comprises a crown 12 reinforced by a crown reinforcement 14, two sidewalls 16 and two beads 18, each of these beads 18 being reinforced with a bead wire 20. The crown 12 is surmounted by a tread, not shown in this schematic figure. A carcass reinforcement 22 is wound around the two bead wires 20 in each bead 18 and comprises a turn-up 24 positioned towards the outside of the tyre 10 which here is shown fitted on a rim 26.

The carcass reinforcement 22, in a manner known per se, consists of at least one ply reinforced by wires or cords. These wires or cords of the carcass reinforcement are referred to as "radial" wires or cords, that is to say that these wires or cords are positioned practically parallel to one another and extend from one bead to the other so as to form an angle of between 80° and 90° with the circumferential median plane (plane perpendicular to the axis of rotation of the tyre which is situated midway between the two beads 18 and passes through the middle of the crown reinforcement 14).

The crown reinforcement 14 comprises at least one ply reinforced by wires or cords in accordance with the invention. In this crown reinforcement 14 depicted in a very simple manner in FIG. 1, it will be understood that the wires or cords of the invention may for example reinforce all or some of the working crown plies or triangulation crown plies (or half plies) and/or protective crown plies, when such triangulation or protective crown plies are used. Besides the working plies, and the triangulation and/or protective plies, the crown reinforcement 14 of the tyre of the invention may of course comprise other crown plies, for example one or more hooping crown plies.

Of course, the tyre 10 additionally comprises, in a known manner, an inner rubber or elastomer layer (commonly referred to as "inner liner") which defines the radially inner face of the tyre and which is intended to protect the carcass reinforcement from the diffusion of air originating from the space inside the tyre. Advantageously, in particular in the case of a tyre for a heavy-duty vehicle, it may also comprise an intermediate reinforcing elastomer layer which is located between the carcass reinforcement and the inner layer, intended to reinforce the inner layer and, consequently, the carcass reinforcement, and also intended to partially delocalize the stresses experienced by the carcass reinforcement.

The tyre is manufactured by assembling the various elements described above present in the form of semi-finished elements comprising a rubber matrix in which the wires or cords in accordance with the invention are embedded.

Cord

In the case where the crown and/or carcass reinforcement is reinforced by cords, these are manufactured by assembling several steel wires in accordance with the invention, either by cabling or by twisting.

In the case of a tyre for industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles, the crown and/or carcass reinforcement is reinforced by cords in accordance with the invention in particular selected from layered cords of 1+3+8, 1+6+11, 1+6+12, 2+7, 3+8, 3+9 and 3+9+15 structure and stranded cords of 3×(1+5), (1+6)×(3+8), (1+6)×(3+9+15) and (1+6)×(4+10+16) structure. Other cords that can reinforce the crown and/or carcass reinforcement are also described in document WO 2010/139583.

In the case of a tyre for passenger vehicles, the crown and/or carcass reinforcement is reinforced by cords in accordance with the invention and in particular selected from the cords of 2+1, 2+2, 2+4 and 4×3 structure.

The cords in accordance with the invention may be rubberized in situ, as is described, among others, in document WO 2010/139583.

The crown and/or carcass reinforcement may also be reinforced by one or more individual wires in accordance with the invention but that are not assembled.

Wire

The wire is made of steel, that is to say that it consists predominantly (i.e. for more than 50% by weight) or completely (for 100% by weight) of steel.

The wire is preferably made of ferritic-pearlitic or pearlitic carbon steel, denoted hereinbelow by "carbon steel" (by definition, steel comprising at least 11% of chromium and at least 50% iron). The steel used, since it is in particular a carbon steel, comprises a carbon content C by weight of steel such that $0.4\% \leq C \leq 0.74\%$. The steel used comprises iron, between 0.3% and 0.7% by weight of manganese, here 0.5%, between 0.1% and 0.3% by weight of silicon, here 0.2%, at most 0.045% by weight of phosphorus, here 0%, at most 0.045% by weight of sulphur, here 0%, and at most 0.008% by weight of nitrogen, here 0%.

The steel used may also comprise specific alloying elements such as Cr, Ni, Co, V, or various other known elements (see, for example, *Research Disclosure 34984—"Micro-alloyed steel cord constructions for tyres"*—May 1993; *Research Disclosure 34054—"High tensile strength steel cord constructions for tyres"*—August 1992) that make it possible to adapt the steel to a very specific use.

Optionally, the steel used comprises at most 0.1% limit included, preferably 0.05% limit included, and more preferably 0.02% limit included by weight of vanadium, here 0%.

Optionally, the steel used comprises at most 0.1% limit included, preferably 0.05% limit included, and more preferably 0.02% limit included by weight of chromium, here 0%.

Optionally, the steel used comprises at most 0.1% limit included, preferably 0.05% limit included, and more preferably 0.02% limit included by weight of molybdenum, here 0%.

Optionally, the steel used comprises at most 0.1% limit included, preferably 0.05% limit included, and more preferably 0.02% limit included by weight of vanadium, chromium and molybdenum.

Optionally, the steel used comprises at most 0.05% limit included, preferably 0.01% limit included, and more preferably 0.001% limit included by weight of nickel, here 0%.

Optionally, the steel used comprises at most 0.05% limit included, preferably 0.01% limit included, and more preferably 0.001% limit included by weight of boron, here 0%.

Optionally, the steel used comprises at most 0.05% limit included, preferably 0.01% limit included, and more preferably 0.001% limit included by weight of cobalt, here 0%.

The wire may be coated with a metal layer that improves, for example, the processing properties of the wire, or the usage properties of the wire, of the cord and/or of the tyre themselves, such as the adhesion, corrosion resistance or else ageing resistance properties. Preferably, the wire is coated with a layer of brass (Cu—Zn alloy) or zinc.

In Table 1 below wires according to the prior art and the invention are assembled.

The wires of the examples from Tables 1 to 4 have a diameter d of greater than or equal to 0.10 mm and preferably greater than or equal to 0.12 mm. Moreover, the wires of the examples from Tables 1 to 4 have a diameter d of less than or equal to 0.25 mm and preferably less than or equal to 0.23 mm.

TABLE 1

|  | Prior art 1 | Example 1 | Example 2 |
|---|---|---|---|
| Carbon content C by weight (%) | 0.45 | 0.45 | 0.45 |
| Diameter d of the wire (mm) | 0.15 | 0.15 | 0.18 |
| Maximum tensile strength R (MPa) | 2035 | 3110 | 3030 |

Examples 1 and 2 are such that, contrary to the wire from the prior art 1, the maximum tensile strength R of the wire, expressed in MPa, is such that $R \geq A \times (920 \times C + 500)/d^{1/2}$ with $A=0.87$.

It will be noted that the wires from Examples 1 and 2 are such that $A=1$, preferably $A=1.10$ and more preferably $A=1.30$.

It will be noted that the wires from Examples 1 and 2 are such that $R \geq 2600$ MPa, preferably $R \geq 2800$ MPa and more preferably $R \geq 3000$ MPa.

TABLE 2

|  | Prior art 2 | Example 3 | Example 4 | Example 5 |
|---|---|---|---|---|
| Carbon content C by weight (%) | 0.585 | 0.585 | 0.585 | 0.585 |
| Diameter d of the wire (mm) | 0.18 | 0.15 | 0.15 | 0.18 |
| Maximum tensile strength R (MPa) | 2900 | 3120 | 3370 | 3295 |

Examples 3 to 5 are such that, contrary to the wire from the prior art 2, the maximum tensile strength R of the wire, expressed in MPa, is such that $R \geq A \times (920 \times C + 500)/d^{1/2}$ with $A=1$ and $R \geq 2950$ MPa.

It will be noted that the wires from Examples 3 to 5 are such that $A=1.10$. It will also be noted that the wires from Examples 4 and 5 are such that $A=1.18$. It will finally be noted that the wire from Example 5 is such that $A=1.26$.

It will be noted that the wires from Examples 3 to 5 are such that $R \geq 3100$ MPa. It will be noted that the wires from Examples 4 and 5 are such that $R \geq 3200$ MPa. It will finally be noted that the wire from Example 4 is such that $R \geq 3300$ MPa.

TABLE 3

|  | Prior art 3 | Example 6 |
|---|---|---|
| Carbon content C by weight (%) | 0.71 | 0.71 |
| Diameter d of the wire (mm) | 0.15 | 0.15 |
| Maximum tensile strength R (MPa) | 2850 | 3590 |

Example 6 is such that, contrary to the wire from the prior art 3, the maximum tensile strength R of the wire, expressed in MPa, is such that, for $d<0.17$ mm, $R \geq A \times (920 \times C + 500)/d^{1/2}$ with $A=0.96$.

It will be noted that the wire from Example 6 is such that, for $d<0.17$ mm, $A=1.10$, preferably $A=1.14$ and more preferably still $A=1.18$.

It will be noted that the wire from Example 6 is such that, for $d<0.17$ mm, $R \geq 2900$ MPa, preferably $R \geq 3200$ MPa, more preferably $R \geq 3300$ MPa, and more preferably still $R \geq 3400$ MPa.

TABLE 4

|  | Prior art 4 | Example 7 | Example 8 |
|---|---|---|---|
| Carbon content C by weight (%) | 0.71 | 0.71 | 0.71 |
| Diameter d of the wire (mm) | 0.18 | 0.18 | 0.18 |
| Maximum tensile strength R (MPa) | 2820 | 3570 | 3660 |

Examples 7 and 8 are such that, for $0.17 \leq d \leq 0.23$ mm, contrary to the wire from the prior art 4, the maximum tensile strength R of the wire, expressed in MPa, is such that, $R \geq A \times (920 \times C + 500)/d^{1/2}$ with $A = 1.24$.

It will be noted that the wires from Examples 7 and 8 are such that, for $0.17 \leq d \leq 0.23$ mm, preferably, $A = 1.26$ and more preferably $A = 1.28$. It will also be noted that the wire from Example 8 is such that, for $0.17 \leq d \leq 0.23$ mm, preferably, $A = 1.30$.

It will be noted that the wires from Examples 7 and 8 are such that, for $0.17 \leq d \leq 0.23$ mm, $R \geq 3000$ MPa, preferably $R \geq 3200$ MPa, more preferably $R \geq 3250$ MPa, and more preferably still $R \geq 3500$ MPa.

The wires from Examples 1 to 8 have a maximum tensile strength $R \leq 3.7 \times (920 \times C + 500)$, preferably $R \leq 3.6 \times (920 \times C + 500)$ and more preferably $R \leq 3.5 \times (920 \times C + 500)$.

Example of Process for Drawing the Wire According to the Invention

Figure 2:
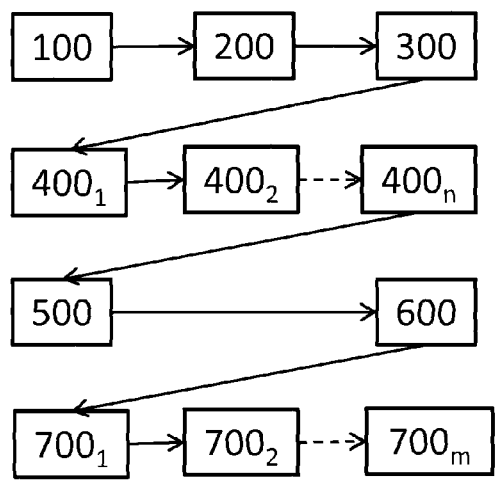
FIG. 2 is a diagram illustrating steps of a drawing process according to the invention.

Represented in FIG. 2 is a diagram of a process that makes it possible to draw the wire as described above.

In an uncoiling step 100, a steel wire of initial diameter $D \geq 4$, preferably $D \geq 5$, here equal to 5.5 mm and having a maximum tensile strength of between 850 MPa and 1200 MPa, in this case $R = 1200$ MPa, is uncoiled. The wire, referred to as wire stock, is stored in the form of a coil on a pay-off reel from which it is uncoiled using automated uncoiling means, for example an uncoiler. The steel microstructure is then ferritic-pearlitic.

In a step 200 of descaling the wire stock, the wire stock is passed into several successive pulleys and into two straighteners each formed by several pulleys, the pulleys of each straightener being rotatably mounted about an axis perpendicular to the axis of rotation of the pulleys of the other straightener. A layer of iron oxides, referred to as scale, present at the surface of the wire stock is thus removed.

In a step 300, the wire stock is coated with a layer of an adhesion promoter for a drawing lubricant.

The objective of steps $400_1$ to $400_n$ is to reduce the diameter of the wire from the initial diameter D to an intermediate diameter d', for example greater than or equal to 1 mm and preferably greater than or equal to 1.3 mm and for example less than or equal to 2.2 mm and preferably less than or equal to 2 mm.

Steps $400_1$ to $400_n$ (n varying from 6 to 12) form an uninterrupted series of dry drawing steps of the wire from the initial diameter D to the intermediate diameter d'. Each step $400_1$ to $400_n$ is a dry drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the uninterrupted series of dry drawing steps of the wire from the initial diameter D to the intermediate diameter d', the true strain is defined as $\epsilon = 2 \times \ln(D/d')$.

Means for pulling the wire that are positioned downstream of each die, here capstans, make it possible to exert a pulling force sufficient to draw the wire through each die. A drawing lubricant in pulverulent form is used.

In a heat treatment step 500, the metallographic structure of the wire of intermediate diameter d' is modified in order to regenerate the structure of the wire stock.

During this step 500, the wire of intermediate diameter d' is heated at the austenitization temperature of the steel, here greater than or equal to 850° C., then it is cooled so as to give the steel a pearlitic or ferritic-pearlitic microstructure.

In a step 600, the wire of intermediate diameter d' is coated with at least one metal layer, here a layer of brass.

The objective of steps $700_1$ to $700_m$ (m varying from 8 to 23) is to reduce the diameter of the wire from the intermediate diameter d' to the final diameter d and to increase the maximum tensile strength of the wire.

Steps $700_1$ to $700_m$ form an uninterrupted series of wet drawing steps of the wire from the intermediate diameter d' to the final diameter d. Each step $700_1$ to $700_m$ is a wet drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the uninterrupted series of wet drawing steps of the wire from the intermediate diameter d' to the final diameter d, the true strain is defined as $\epsilon' = 2 \times \ln(d'/d)$.

As a variant, steps $700_1$ to $700_m$ will be carried out in a dry environment.

Means for pulling the wire that are positioned downstream of each die, here stepped capstans, make it possible to exert a pulling force sufficient to draw the wire through each die. The pulling means and the dies are immersed in a liquid bath of drawing lubricant, for example as described in document WO 2008/113481.

The drawing process thus comprises N uninterrupted series of drawing steps, for example one in a dry environment and one in a wet environment. Here $N = 2$. Thus, it is possible to define the total true strain for the drawing process as $\epsilon T = 2 \times \ln(D/d)$.

The drawing process comprises M heat treatment step(s) that aim to regenerate the structure of the wire stock. Here $M = 1$ which makes it possible to reduce the industrial production cost of the wire of diameter d.

The wire is capable of being obtained by the process according to the invention.

In Table 5 various values of the characteristics of the wires and of the process described above and of a wire from the prior art are assembled.

TABLE 5

|  | Prior art 1 | Example 1 | Example 2 |
|---|---|---|---|
| C (%) | 0.45 | 0.45 | 0.45 |
| d' (mm) | 0.75 | 1.75 | 2 |
| d (mm) | 0.15 | 0.15 | 0.18 |
| $\epsilon$ | 4.0 | 2.3 | 2.0 |
| $\epsilon'$ | 3.2 | 4.9 | 4.8 |
| $\epsilon T$ | 7.2 | 7.2 | 6.8 |
| R (MPa) | 2035 | 3110 | 3030 |

It will be noted that, for Examples 1 and 2, $\epsilon \leq 3$, preferably $\epsilon \leq 2.75$ and more preferably $\epsilon \leq 2.5$. It will also be noted that, for Examples 1 and 2, $\epsilon T \geq 6.5$ and preferably $\epsilon T \geq 6.75$. For Example 3, more preferably $\epsilon T \geq 7$.

Moreover, it will be noted that, unlike prior art 1, $\epsilon' > 4$, or even $\epsilon' \geq 4.3$, preferably $\epsilon' \geq 4.5$ and more preferably $\epsilon' \geq 4.7$ for Examples 1 and 2.

TABLE 6

|        | Prior art 2 | Example 3 | Example 4 | Example 5 |
|--------|-------------|-----------|-----------|-----------|
| C (%)  | 0.585       | 0.585     | 0.585     | 0.585     |
| d' (mm)| 1.3         | 1.3       | 1.5       | 1.7       |
| d (mm) | 0.18        | 0.15      | 0.15      | 0.18      |
| $\epsilon$ | 2.9     | 2.9       | 2.6       | 2.3       |
| $\epsilon'$ | 4.0    | 4.3       | 4.6       | 4.6       |
| $\epsilon T$ | 6.9   | 7.2       | 7.2       | 6.9       |
| R (MPa)| 2900        | 3120      | 3370      | 3295      |

It will be noted that, for Examples 3 to 5, $\epsilon \leq 3$, preferably $\epsilon \leq 2.75$ for Examples 4 and 5 and more preferably $\epsilon \leq 2.5$ for Example 5. It will also be noted that, for Examples 3 to 5, $\epsilon T \geq 6.5$ and preferably $\epsilon T \geq 6.75$. For Examples 3 and 4, more preferably $\epsilon T \geq 7$.

Moreover, it will be noted that, unlike prior art 2, $\epsilon' > 4$ for Examples 3 to 5, or even $\epsilon' \geq 4.3$ and preferably $\epsilon' \geq 4.5$ for Examples 4 and 5.

TABLE 7

|        | Prior art 3 | Example 6 | Prior art 4 | Example 7 | Example 8 |
|--------|-------------|-----------|-------------|-----------|-----------|
| C (%)  | 0.71        | 0.71      | 0.71        | 0.71      | 0.71      |
| d' (mm)| 0.75        | 1.3       | 1           | 1.5       | 1.7       |
| d (mm) | 0.15        | 0.15      | 0.18        | 0.18      | 0.18      |
| $\epsilon$ | 4.0     | 2.9       | 3.4         | 2.5       | 2.3       |
| $\epsilon'$ | 3.2    | 4.3       | 3.4         | 4.3       | 4.5       |
| $\epsilon T$ | 7.2   | 7.2       | 6.8         | 6.8       | 6.8       |
| R (MPa)| 2850        | 3590      | 2820        | 3570      | 3660      |

It will be noted that, for Examples 6 to 8, $\epsilon \leq 3$, preferably $\epsilon \leq 2.75$ for Examples 7 and 8 and more preferably $\epsilon \leq 2.5$ for Example 8. It will also be noted that, for Examples 6 to 8, $\epsilon T \geq 6.5$ and preferably $\epsilon T \geq 6.75$. For Example 6, more preferably $\epsilon T \geq 7$.

Moreover, it will be noted that, unlike prior art 3 and 4, $\epsilon' > 4$, or even $\epsilon' \geq 4.3$ for Examples 6 to 8. Preferably, $\epsilon' \geq 4.5$ for Example 8.

The invention is not limited to the embodiments described above.

Indeed, the descaling step 200 may be carried out by the action of a chemical agent, for example acid.

Furthermore, during step 600, it is possible to coat the wire of intermediate diameter only with a layer of zinc. Moreover, the wire could be covered with a metal layer other than brass or zinc, having for example the role of improving the corrosion resistance of the wire and/or the adhesion thereof to the rubber, for example a thin layer of Co, Ni, Al, or an alloy of two or more of the compounds Cu, Zn, Al, Ni, Co and Sn.

Other subjects are capable of being obtained using the process according to the invention. Thus, it is possible to obtain a cord comprising several wires obtained by the process according to the invention. Such cords are of layered type or of stranded type. It is recalled that there are two possible techniques for assembling wires or strands:

either by cabling: in such a case, the wires or strands undergo no twisting about their own axis, because of a synchronous rotation before and after the assembly point;

or by twisting: in such a case, the wires or strands undergo both a collective twist and an individual twist about their own axis, thereby generating an untwisting torque on each of the wires or strands.

It is also possible to obtain a semi-finished element comprising a rubber matrix in which at least one wire obtained by the process according to the invention is embedded.

The rubber matrix comprises at least a diene elastomer, a reinforcing filler, a vulcanization system and various additives.

The diene elastomer of the rubber matrix is generally understood to mean an elastomer resulting at least in part (i.e. a homopolymer or a copolymer) from diene monomers (monomers bearing two conjugated or unconjugated carbon-carbon double bonds).

Diene elastomers, as is known, can be classified into two categories: those referred to as "essentially unsaturated" and those referred to as "essentially saturated". Particularly preferably, the diene elastomer of the rubber matrix is selected from the group of (essentially unsaturated) diene elastomers consisting of polybutadienes (BR), synthetic polyisoprenes (IR), natural rubber (NR), butadiene copolymers, isoprene copolymers and mixtures of these elastomers. Such copolymers are more preferably selected from the group consisting of butadiene-styrene copolymers (SBR), isoprene-butadiene copolymers (BIR), isoprene-styrene copolymers (SIR), isoprene-butadiene-styrene copolymers (SBIR) and mixtures of such copolymers.

The rubber matrix may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

As reinforcing filler, use is preferably made of carbon black or an inorganic filler. More particularly, all carbon blacks, especially the blacks of HAF, ISAF and SAF type, conventionally used in tyres, are suitable as carbon blacks. As nonlimiting examples of such blacks, mention may be made of the N115, N134, N234, N330, N339, N347 and N375 blacks. However, the carbon black may of course be used as a blend with reinforcing fillers and in particular other inorganic fillers. Such inorganic fillers include silica, especially highly dispersible silicas, for example the Ultrasil 7000 and Ultrasil 7005 silicas from Degussa.

Lastly, a person skilled in the art will understand that, as filler equivalent to the reinforcing inorganic filler described in the present paragraph, a reinforcing filler of another nature, in particular organic nature, could be used provided that this reinforcing filler is covered with an inorganic layer such as silica, or else comprises functional sites, in particular hydroxyl sites, at its surface that require the use of a coupling agent in order to form the bond between the filler and the elastomer.

It is also possible to add to the reinforcing filler, depending on the targeted application, inert (non-reinforcing) fillers such as clay particles, bentonite, talc, chalk and kaolin, that can be used for example in sidewalls or treads of coloured tyres.

The rubber matrix may also comprise all or some of the standard additives customarily used in the elastomer compositions intended for the manufacture of tyres, such as for example plasticizers or extending oils, whether the latter are aromatic or non-aromatic in nature, pigments, protective agents, such as antiozone waxes, chemical antiozonants, antioxidants, antifatigue agents, reinforcing resins, methylene acceptors (for example phenolic novolac resin) or methylene donors (for example HMT or H3M).

The rubber matrix also comprises a vulcanization system based either on sulphur or on sulphur donors and/or on peroxide and/or on bismaleimides, vulcanization accelerators and vulcanization activators.

The actual vulcanization system is preferably based on sulphur and on a primary vulcanization accelerator, in particular an accelerator of sulphenamide type, such as selected from the group consisting of 2-mercaptobenzothiazyl disulphide (MBTS), N-cyclohexyl-2-benzothiazyl sulphenamide (CBS), N,N-dicyclohexyl-2-benzothiazyl sulphenamide (DCBS), N-tert-butyl-2-benzothiazyl sulphenamide (TBBS), N-tert-butyl-2-benzothiazyl sulphenimide (TBSI) and mixtures of these compounds.

Lastly, it is possible to obtain a tyre comprising a wire obtained by the process according to the invention.

Preferably, the tyre is intended for passenger vehicles, industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles. More preferably, the tyre is intended for heavy vehicles, agricultural or civil engineering machinery, aircraft, and other transport or handling vehicles.

Preferably, the wire is intended to reinforce a tyre crown and/or carcass reinforcement. More preferably, the wire is intended to reinforce a tyre carcass reinforcement.

Preferably, the tyre is for a vehicle of the heavy-duty vehicle type, comprising a carcass reinforcement comprising at least one wire obtained by the process according to the invention.

The invention claimed is:

1. A process for drawing a steel wire, the process comprising steps of:
   providing a steel wire having a carbon content by weight C of $0.4\% \leq C < 0.5\%$;
   preliminarily drawing the steel wire in an uninterrupted series of preliminary drawing procedures to draw the steel wire from a diameter D to a diameter d'; and
   drawing the steel wire in an uninterrupted series of drawing procedures, such that the steel wire is drawn from the diameter d' to a diameter d,
   wherein D is the diameter of the steel wire immediately before a first preliminary drawing procedure of the uninterrupted series of preliminary drawing procedures,
   wherein d' is the diameter of the steel wire immediately after a last preliminary drawing procedure of the uninterrupted series of preliminary drawing procedures and immediately before a first drawing procedure of the uninterrupted series of drawing procedures,
   wherein d is the diameter of the steel wire immediately after a last drawing procedure of the uninterrupted series of drawing procedures,
   wherein D, d', and d are expressed in mm,
   wherein a true strain $\epsilon'$ of the steel wire is given by $\epsilon' = 2 \times \ln(d'/d)$, with $\epsilon' > 4$, and
   wherein a total true strain $\epsilon T$ of the steel wire is given by $\epsilon T = 2 \times \ln(D/d)$, with $\epsilon T \geq 6.75$.

2. The process according to claim 1, wherein $\epsilon' \geq 4.3$.

3. The process according to claim 2, wherein $\epsilon' \geq 4.5$.

4. The process according to claim 3, wherein $\epsilon' \geq 4.7$.

5. The process according to claim 1, wherein d' is greater than or equal to 1 mm.

6. The process according to claim 1, wherein d' is less than or equal to 2.2 mm.

7. The process according to claim 1, wherein d is greater than or equal to 0.10 mm.

8. The process according to claim 1, wherein d is less than or equal to 0.25 mm.

9. The process according to claim 1, wherein a microstructure of the steel wire is ferritic-pearlitic or pearlitic.

10. The process according to claim 1, wherein the uninterrupted series of drawing procedures is carried out in a wet environment.

11. The process according to claim 1, wherein a true strain $\epsilon$ of the preliminarily drawn steel wire is given by $\epsilon = 2 \times \ln(D/d')$, with $\epsilon \leq 3$.

12. The process according to claim 11, wherein $\epsilon \leq 2.75$.

13. The process according to claim 12, wherein $\epsilon \leq 2.5$.

14. The process according to claim 1, wherein the uninterrupted series of preliminary drawing procedures is carried out in a dry environment.

15. The process according to claim 1, wherein $\epsilon T \geq 7$.

16. The process according to claim 1, wherein D is greater than or equal to 4 mm.

17. The process according to claim 1, further comprising a step of, before the step of drawing the steel wire from the diameter d' to the diameter d, heat treating the steel wire having the diameter d'.

18. The process according to claim 1, further comprising a step of, before the step of drawing the steel wire from the diameter d' to the diameter d, coating the steel wire having the diameter d' with at least one metal layer.

19. The process according to claim 1, wherein, after the drawing step, a maximum tensile strength of the steel wire is equal to or greater than 2950 MPa.

20. The process according to claim 1, wherein, after the drawing step, a maximum tensile strength of the steel wire is in a range of from 2950 MPa to 3660 MPa.

21. The process according to claim 1, wherein, in the step of providing the steel wire, the steel wire has a carbon content by weight C of $0.4\% \leq C \leq 0.48\%$.

22. The process according to claim 1, wherein, in the step of providing the steel wire, the steel wire has a carbon content by weight C of $0.42\% \leq C \leq 0.48\%$.

* * * * *